Oct. 16, 1951        E. C. HARMANSON        2,571,361
BOAT TRAILER AND HOISTING MECHANISM THEREFOR

Filed May 18, 1948        2 Sheets-Sheet 1

INVENTOR.
Ernest C. Harmanson
BY
Atty.

Oct. 16, 1951 — E. C. HARMANSON — 2,571,361
BOAT TRAILER AND HOISTING MECHANISM THEREFOR
Filed May 18, 1948 — 2 Sheets-Sheet 2

INVENTOR.
Ernest C. Harmanson

Patented Oct. 16, 1951

2,571,361

UNITED STATES PATENT OFFICE 2,571,361

BOAT TRAILER AND HOISTING MECHANISM THEREFOR

Ernest C. Harmanson, Portland, Oreg.

Application May 18, 1948, Serial No. 27,727

6 Claims. (Cl. 214—65)

My invention pertains to trailers, and relates particularly to boat trailers and to mechanism thereof for loading and unloading boats.

A principal object of my invention is to provide simple mechanical means mounted on a trailer for hoisting a boat or other load thereupon.

Another object of my invention is to provide a trailer on which is pivotally mounted an arched frame by means of which a boat or other load may be readily loaded upon or unloaded from said trailer.

A further object is to provide, in combination with a boat trailer, manually controlled hoisting mechanism by means of which a boat may be hauled from the water and loaded upon said trailer in a single continuous operation.

Figure 1:
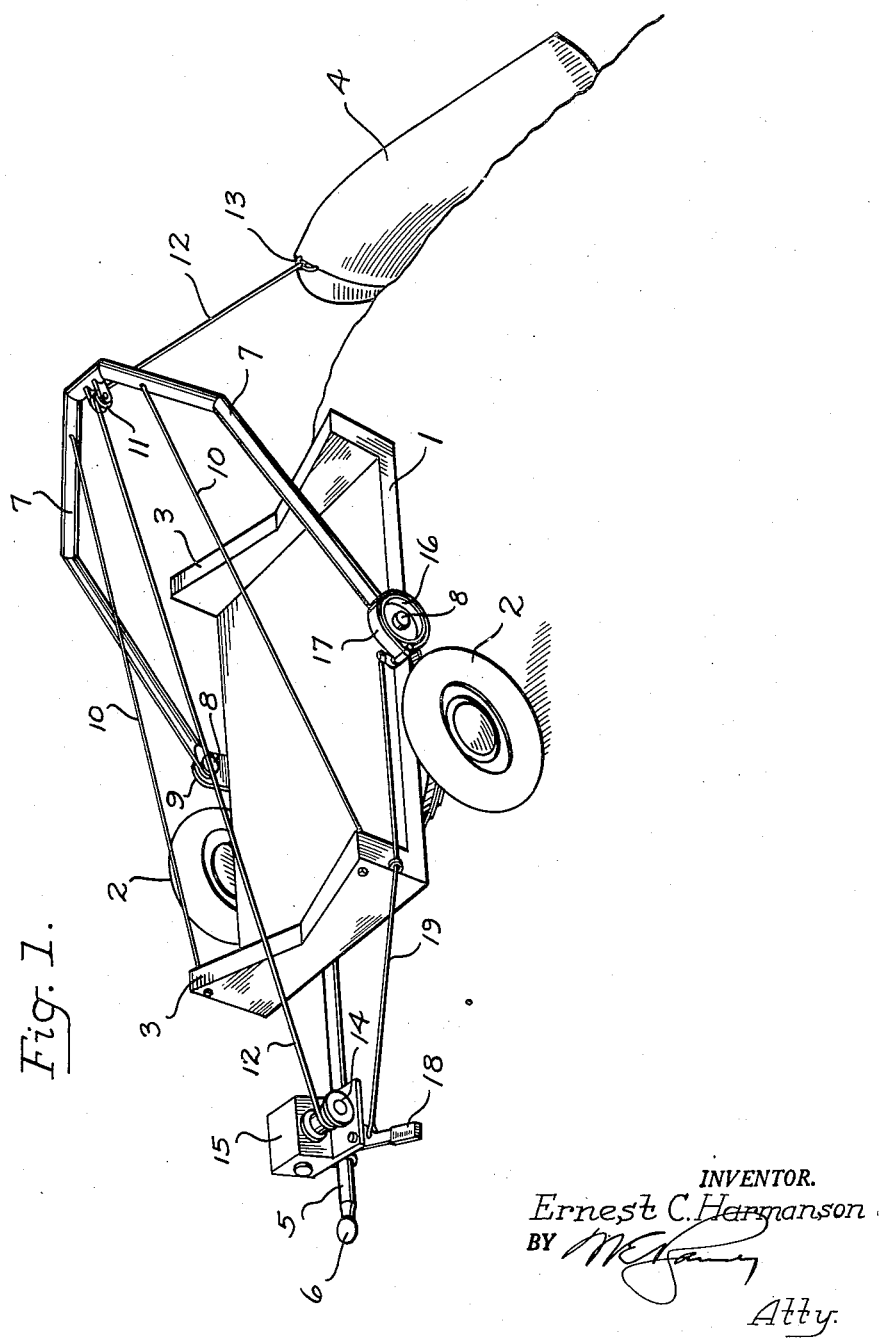
Figure 2:
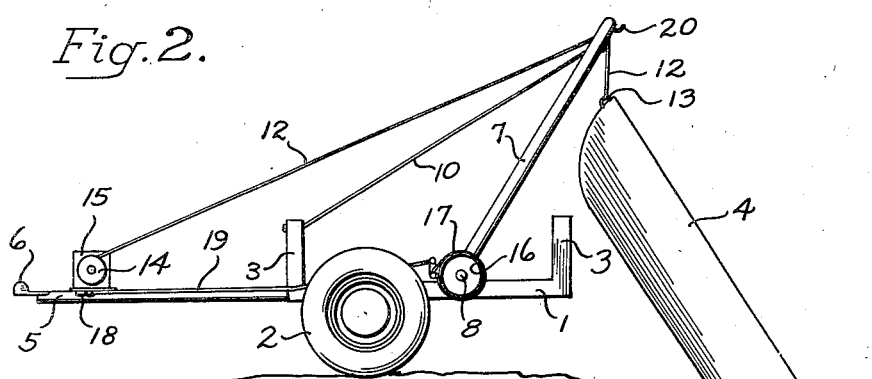
Figure 3:
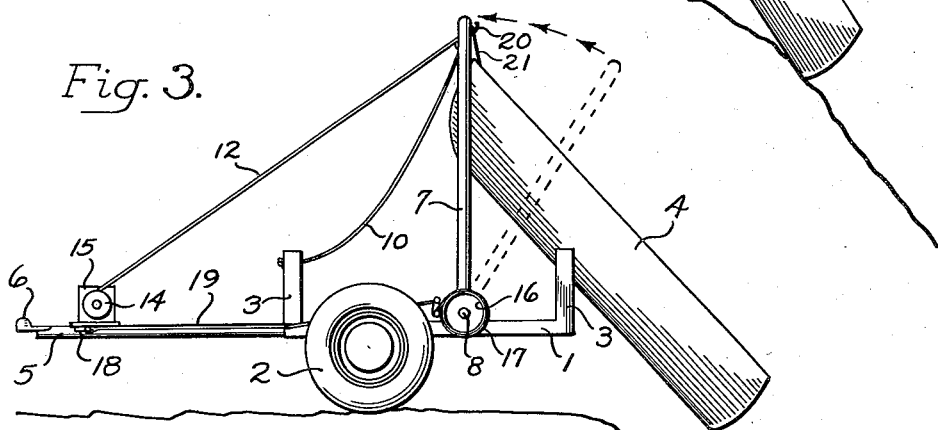
Figure 4:
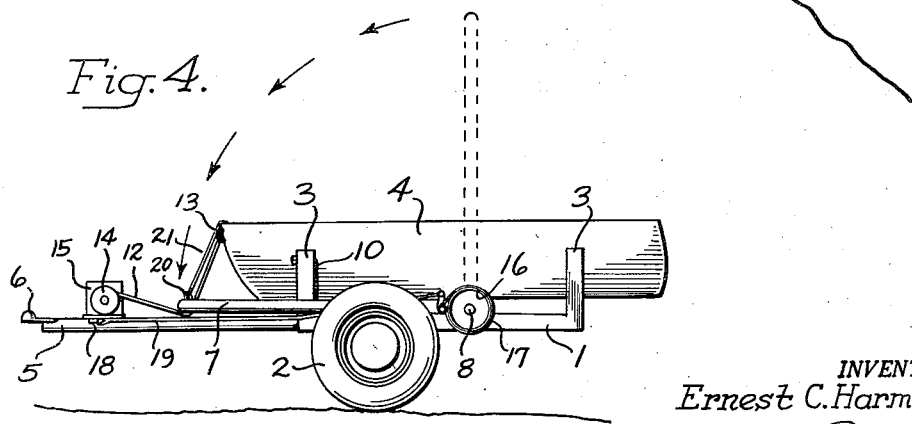

Other objects and advantages of my invention will appear from the following detailed description taken in connection with the accompanying drawings, in which:

Fig. 1 is a perspective view illustrating the features of the present invention as applied to a boat trailer; and Figs. 2, 3 and 4 are side elevations illustrating in sequential steps the boat loading operation as performed by the mechanism of my invention.

Referring to the drawings, the trailer comprises a body 1 resiliently supported upon wheels 2. The longitudinal ends of said body are provided with V-shaped chocks 3 upon which the boat 4 may be positioned. Extending forwardly of the trailer body is a tow tongue 5 provided at its extremity with the usual coupling 6 by means of which the trailer is connected to an automobile. The hoisting mechanism of my invention, presently to be described, may be used with other types of trailer construction, depending upon the type of load to be hauled, as will be apparent to those skilled to the art.

An arch-shaped frame 7 is pivotally mounted at its lower end in trunnions 8 mounted in brackets 9 secured to opposite sides of the trailer body. Guy ropes 10 are secured at one end to the forward end of the trailer body and at the opposite end to the frame 7 to limit the rearward rotation of the latter about the trunnions. A pulley wheel 11 is mounted between brackets depending from the apex of the arched frame and serves as an idler guide for the lifting line 12 which is reeved thereover. One end of the lifting line is adapted to be fastened to the bow of the boat 4, as by means of the eyelet 13. The opposite end of said line 12 is secured to the drum 14 of a winch 15 mounted, as shown in the drawings, upon the tow tongue 5 forwardly of the arched frame. The winch may be of the power driven type illustrated, or may be of the simple crank operated type, as preferred.

A braking system is provided in order selectively to control the movement of the arched frame during the loading operation. A brake drum 16 is firmly secured to one of the trunnions 8 and is encircled by a brake band 17 mounted on the trailer body. The brake band is tightened and loosened by means of a brake lever 18 pivotally mounted on the base of the winch 15 and inter-connected with said band by a cord or brake rod 19. Thus, the arched frame may be releasably secured at any position throughout its arc of rotation. A hook 20 projects outwardly from the apex of the arched frame to receive the free end of a short anchor line 21 secured to the bow of the boat for purposes to be explained hereinafter.

With the boat located at the bank of a lake or stream and the trailer positioned a distance away, the loading operation is as follows: The lifting line 12 is paid out from the winch 15, running freely over the guide pulley 11, and is fastened at its free end to the eyelet 13 secured in the bow of the boat. With the hoisting mechanism thus arranged in the position shown in Fig. 1 of the drawings, and the brake secured in locking position, the winch 15 is operated, causing the lifting rope to be wound upon the drum 14, thereby pulling the boat up the bank toward the trailer. When the boat has been drawn into the position shown in Fig. 2, the lifting line has been pulled in until the arched frame 7 has been brought to the vertical position shown in Fig. 2. The free end of a short anchor line 21 may be looped over the hook 20. Said anchor chain may be used if no brake drum 16 is provided to tie the bow of the boat in short coupled relation to the arch. Said anchor chain can be dispensed with if desired and said brake drum is provided and is utilized, because the boat may be lifted until it bucks against the arch frame. Upon releasing the brake and further winding in the tow line, the arched frame is caused to rotate forwardly, i. e. in a counter-clockwise direction, as viewed in the drawings. Thereafter, as the tow line is drawn in the boat is hoisted upwardly upon the rear chocks and drawn forward to the position shown in Fig. 4. It is readily apparent that by virtue of the operating controls being grouped at one location, the loading operation may be easily performed by one person.

In unloading the boat from its position upon the the trailer, the winch is released to allow the tow line to be paid out, the brake is disengaged, and a pull is exerted upon the stern of the boat. The bow is thereby caused to be raised as it swings the arched frame upwardly in a clockwise direction to the position shown in Fig. 3. The anchor line 21, if one is used, is thereupon removed from the hook 20, and the boat is pulled rearwardly from the trailer, in substantially the reverse sequence of the loading steps recited hereinbefore. In the event that the boat is to be transported down a steep embankment, the tow line may be paid out slowly by controlled operation of the winch.

I claim:

1. A boat trailer having a body with transversely disposed, spaced, forwardly and rearwardly arranged boat chocks at the ends of said body, respectively, a boat hoisting mechanism including an arched frame, pivotally mounted at one end upon spaced trunnions arranged intermediate said boat chocks upon a transverse pivot axis, and a winch for swinging said frame about said axis, a line guide carried by the upper or free end of said arched frame, a towing line reeved therethrough and operatively engaged at one end to said winch and having a boat engaging element at the other end, said arched frame being proportioned and arranged to direct said line guide along an arcuate path extending from a point lying forwardly of the forward boat chock to a point arranged rearwardly of the rearward boat chock, and flexible means for limiting the rearward movement of said arched frame and permitting the unrestricted movement of said arched frame forwardly therefrom, whereby a boat can be picked up by pulling in said tow line when the arched frame is arranged at its rearward position, slid over the rearward boat chock, and when said arched frame is swung through its arcuate path, by continued pull on said tow line to locate said boat centrally upon both chocks.

2. A boat trailer having a body with transversely disposed, spaced, forwardly and rearwardly arranged boat chocks at the ends of said body, respectively, a boat hoisting mechanism including an arched frame, pivotally mounted at one end upon spaced trunnions arranged intermediate said boat chocks upon a transverse pivot axis, and a winch for swinging said frame about said axis, a line guide carried by the upper or free end of said arched frame, a towing line reeved therethrough and operatively engaged at one end to said winch and having a boat engaging element at the other end, said arched frame being proportioned and arranged to direct said line guide along an arcuate path extending from a point lying forwardly of the forward boat chock to a point arranged rearwardly of the rearward boat chock, and a releasable brake mechanism arranged adjacent the trunnions of said arched frame for locking said arched frame in a selected position, whereby a boat can be picked up by pulling in said tow line when the arched frame is arranged at its rearward position, slid over the rearward boat chock, and when said arched frame is swung through its arcuate path, by continued pull on said tow line to locate said boat centrally upon both chocks.

3. A boat trailer having a body with transversely disposed, spaced, forwardly and rearwardly arranged boat chocks at the ends of said body, respectively, a boat hoisting mechanism including an arched frame, pivotally mounted at one end upon spaced trunnions arranged intermediate said boat chocks upon a transverse pivot axis, and a winch for swinging said frame about said axis, a line guide carried by the upper or free end of said arched frame, a towing line reeved therethrough and operatively engaged at one end to said winch and having a boat engaging element at the other end, said arched frame being proportioned and arranged to direct said line guide along an arcuate path extending from a point lying forwardly of the forward boat chock to a point arranged rearwardly of the rearward boat chock, flexible means for limiting the rearward movement of said arched movement of said arched frame and permitting the unrestricted movement of said arched frame forwardly therefrom, and a releasable brake mechanism arranged adjacent the trunnions of said arched frame for locking said arched frame in a selected position, whereby a boat can be picked up by pulling in said tow line when the arched frame is arranged at its rearward position, slid over the rearward boat chock, and when said arched frame is swung through its arcuate path, by continued pull on said tow line to locate said boat centrally upon both chocks.

4. A boat trailer having a body with transversely disposed, spaced, forwardly and rearwardly arranged boat chocks at the ends of said body, respectively, a boat hoisting mechanism including an arched frame, pivotally mounted at one end upon spaced trunnions arranged intermediate said boat chocks upon a transverse pivot axis, and a winch for swinging said frame about said axis, a line guide carried by the upper or free end of said arched frame, a towing line reeved therethrough and operatively engaged at one end to said winch and having a boat engaging element at the other end, said arched frame being proportioned and arranged to direct said line guide along an arcuate path extending from a point lying forwardly of the forward boat chock to a point arranged rearwardly of the rearward boat chock, and said arched frame spanning said boat chocks, the trunnions therefor being spaced outwardly beyond said chocks, whereby a boat can be picked up by pulling in said tow line when the arched frame is arranged at its rearward position, slid over the rearward boat chock, and when said arched frame is swung through its arcuate path, by continued pull on said tow line to locate said boat centrally upon both chocks.

5. A boat trailer having a body with transversely disposed, spaced, forwardly and rearwardly arranged boat chocks at the ends of said body, respectively, a boat hoisting mechanism including an arched frame, pivotally mounted at one end upon spaced trunnions arranged intermediate said boat chocks upon a transverse pivot axis, and a winch for swinging said frame about said axis, a line guide carried by the upper or free end of said arched frame, a towing line reeved therethrough and operatively engaged at one end to said winch and having a boat engaging element at the other end, said arched frame being proportioned and arranged to direct said line guide along an arcuate path extending from a point lying forwardly of the forward boat chock to a point arranged rearwardly of the rearward boat chock, and said arched frame in its forward position lying horizontally below the horizontal plane of the forward chock, whereby a boat can be picked up by pulling in said tow line when the arched frame is arranged at its rearward position, slid over the rearward boat chock, and when said arched frame is swung through its arcuate path, by continued pull on said tow line to locate said boat centrally upon both chocks.

6. A boat trailer having a body with transversely disposed, spaced, forwardly and rearwardly arranged boat chocks at the ends of said body, respectively, a boat hoisting mechanism including an arched frame, pivotally mounted at one end upon spaced trunnions arranged intermediate said boat chocks upon a transverse pivot axis, and a winch for swinging said frame about said axis, a line guide carried by the upper or free end of said arched frame, a towing line reeved therethrough and operatively engaged at one end to said winch and having a boat engaging element at the other end, said arched frame being proportioned and arranged to direct said line guide along an arcuate path extending from a point lying forwardly of the forward boat chock to a point arranged rearwardly of the rearward boat chock, and said winch lying forwardly of the forward position of said arch accommodating said arch between it and the forward chock to permit said arch partially to encircle said forward chock and assume its horizontal position, whereby a boat can be picked up by pulling in said tow line when the arched frame is arranged at its rearward position, slid over the rearward boat chock, and when said arched frame is swung through its arcuate path, by continued pull on said tow line to locate said boat centrally upon both chocks.

ERNEST C. HARMANSON.

REFERENCES CITED

The following references are of record in the file of this patent:

UNITED STATES PATENTS

| Number | Name | Date |
|---|---|---|
| 1,630,800 | Page | May 31, 1927 |
| 1,909,689 | Kuchar | May 16, 1933 |
| 2,058,473 | Le Tourneau | Oct. 27, 1936 |
| 2,219,401 | Sampsell | Oct. 29, 1940 |
| 2,281,507 | Le Tourneau | Apr. 28, 1942 |
| 2,361,951 | Livermon | Nov. 7, 1944 |
| 2,389,338 | Zorc, Jr. | Nov. 20, 1945 |
| 2,398,274 | Albert | Apr. 9, 1946 |
| 2,433,598 | Chadwick, Jr. | Dec. 30, 1947 |
| 2,444,231 | Sanford | June 29, 1948 |